Sept. 20, 1966  G. BAST  3,273,454
SLIDE PROJECTOR
Filed Feb. 1, 1965  3 Sheets-Sheet 1
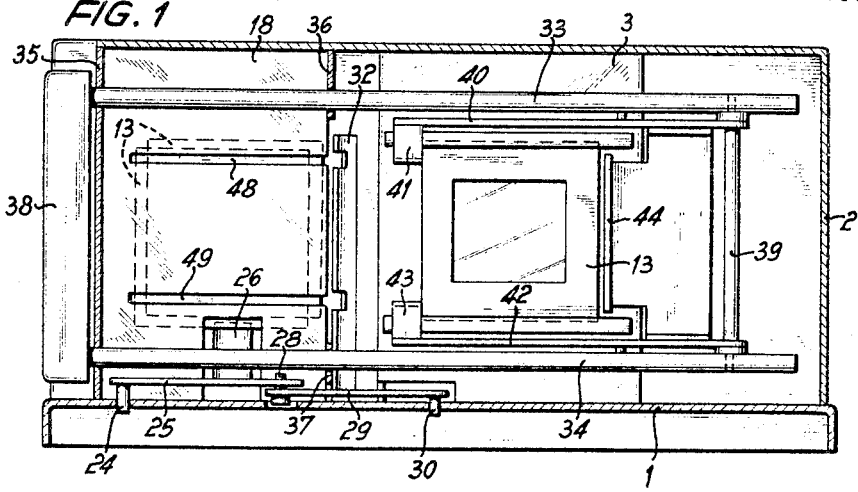
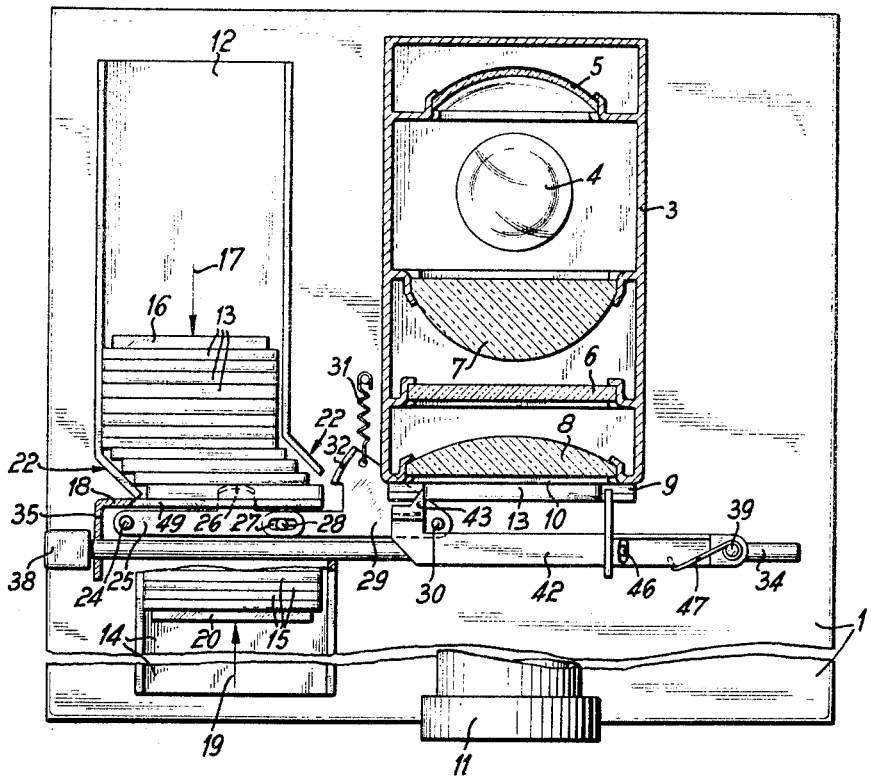

Sept. 20, 1966  G. BAST  3,273,454
SLIDE PROJECTOR
Filed Feb. 1, 1965  3 Sheets-Sheet 2

Sept. 20, 1966  G. BAST  3,273,454
SLIDE PROJECTOR

Filed Feb. 1, 1965  3 Sheets-Sheet 3

United States Patent Office 3,273,454
Patented Sept. 20, 1966

3,273,454
SLIDE PROJECTOR
Gerhard Bast, Braunschweig-Lehndorf, Germany, assignor to Voigtlander A.G., Braunschweig, Germany
Filed Feb. 1, 1965, Ser. No. 429,277
Claims priority, application Germany, Feb. 1, 1964,
V 25,298
12 Claims. (Cl. 88—28)

The present invention relates to slide projectors which are adapted to provide on a suitable screen or the like images of photographic slides.

The slides which are adapted to be used with the projector of the present invention can take any known form and may be in the form of color or black and white transparencies mounted in any suitable frames, or they may be glass slides, or any type of conventional slide adapted to carry a photograph whose image can be projected onto a screen or the like.

The present invention relates in particular to that type of photographic projector which does not have a magazine but which rather is provided with a guide into which a series of slides are introduced so as to be guided to a position where an end one of the series of slides is shifted from the supply guide to a projecting position, the slide after having had its image projected being then displaced to a slide-receiving means. Of course, with a projector of this type slides of all kinds can be introduced into the supply guide means, and thus there will be slides of different thicknesses arranged one next to the other and moving in a stepwise manner along the supply guide means to be successively projected. Of course, if all of the slides have the same thickness, then there is no particular problem in constructing the projector so as to handle slides of a single predetermined thickness. Furthermore, even though there is a tendency for the series of slides which press against each other to cling to each other, nevertheless if only one thickness of slide is to be handled there is no particular problem in constructing the projector in such a way that the end slide of a series of slides will be displaced only by itself to the projecting position even though the slide next to this end slide may tend to cling to the end slide when the latter is displaced to the projecting position. However, when the structure is of the type which receives slides of different thicknesses, and indeed conventional slides can have widely different thicknesses, then there is a very special problem, which has not yet been satisfactorily solved, involving the displacement of only one slide at a time from the supply guide means to the projecting position.

Thus, it is a primary object of the present invention to provide a slide projector of the above type which is capable of reliably displacing only one slide at a time from the supply guide means to the projecting position even though the series of slides which are in the supply guide means have widely different thicknesses.

In particular, it is an object of the present invention to provide a structure which will automatically sense the thickness of the end slide of the series of slides which are to be projected and which, in accordance with the sensed thickness, will permit only the end slide to be displaced by itself from the supply guide means to the projecting position.

Thus, the objects of the present invention include the provision of a structure which will automatically adjust the size of a discharge slot of the supply guide means so that this discharge slot will have a size corresponding to the thickness of the end slide of the series of slides in the supply guide means, so that only this end slide can pass through the discharge slot to the projecting position.

Furthermore, it is an object of the present invention to provide a slide-shifting means which will engage only the end slide of the series of slides in the supply guide means in order to shift only this end slide to the projecting position, even though the series of slides in the supply guide means have widely different thicknesses.

Furthermore, it is an object of the present invention to provide a structure which will guarantee that the structure which displaces a slide away from the projecting position after an image of the photograph of the slide has been projected will displace this latter slide reliably into a slide-receiving means, so that a slide displaced from the projecting position will in no way interfere with the movement of the next slide into the projecting position.

Primarily the structure of the invention includes, in a slide projector, a supply guide means which is adapted to receive a series of slides which are adapted to be moved successively from the supply guide means to a projecting position. This supply guide means of the invention has a discharge end where the end slide of the series of slides is situated in the position to be displaced to the projecting position, and in the region of its discharge end the supply guide means is inclined with respect to a portion of the supply guide means adjacent to its discharge end, so that in this way at least the end slide of the series of slides is displaced with respect to the slide next to the end slide, so as to expose a front surface portion of this slide which is next to the end slide. A thickness-sensing means automatically engages the exposed front surface portion of the slide which is next to the end slide, so as to automatically sense the thickness of the end slide, and an adjusting means is automatically actuated by the thickness-sensing means for adjusting the width of the discharge slot of the supply guide means so that this slot will automatically be provided with a width corresponding to the thickness of the end slide, and thus in this way only the end slide can pass through the discharge slot to the projecting position, even if the slide which is next to the end slide should tend to cling to the end slide so as to move with the latter at least part of the way toward the projecting position.

The invention is illustrated by way of example in the accompanying drawings which form part of the application and in which:

FIG. 1 is a transverse sectional elevation of a slide projector according to the invention showing the discharge end of the supply guide means as it appears from the front of the projector and also showing the slide-shifting means of the invention;

FIG. 2 is a partly schematic and partly broken away top plan view, partly in section, of the projector of FIG. 1 with the hood which covers the projector components removed so as to clearly illustrate these components;

Figure 5:
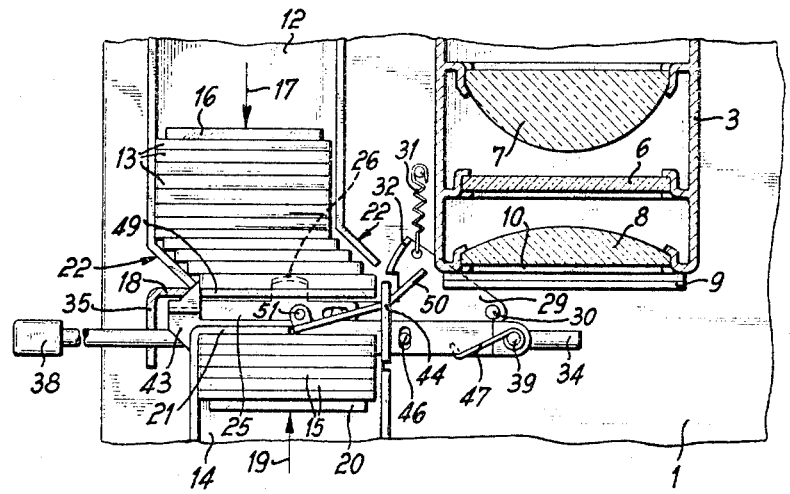
Figure 6:
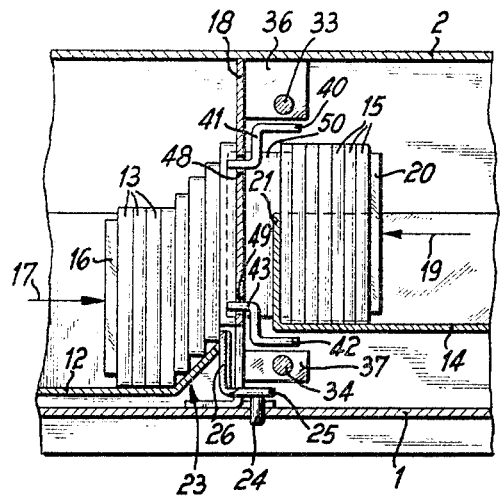

FIG. 5 is a partly schematic fragmentary, partly sectional top plan view showing the position which the parts take when the slide-shifting means has just engaged the end slide at the discharge end of the supply guide means in preparation for shifting this end slide to the projecting position; and FIG. 6 is a longitudinal fragmentary sectional elevation, taken in a plane parallel to the optical axis, and illustrating the manner in which the supply guide means of the invention displaces the slides upwardly in the region of the discharge end of the supply guide means.

Figure 3:
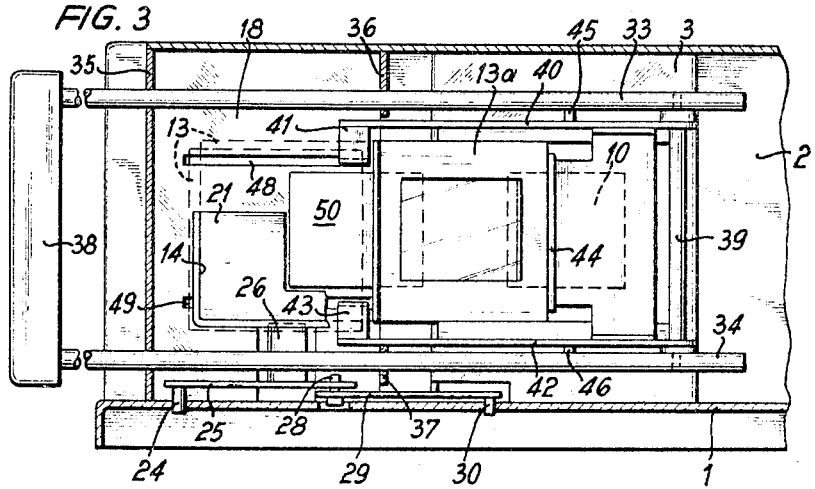
FIG. 3 is a fragmentary illustration of the parts of FIG. 1 shown in a position they take during transportation of a slide from the supply guide means to the projecting position.
Figure 4:
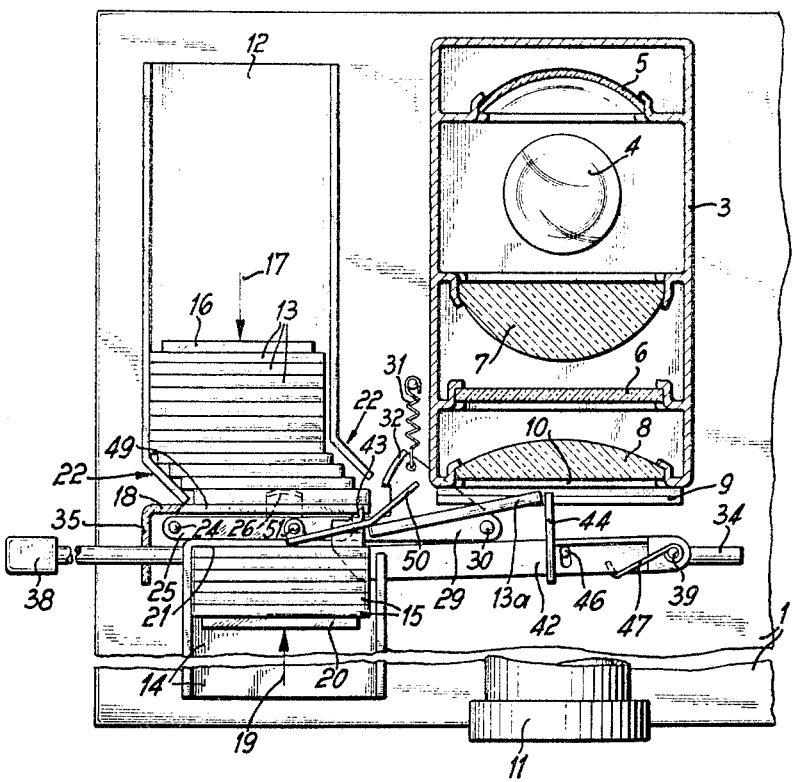
FIG. 4 is a fragmentary, partly broken away, top plan view of the structure of FIG. 3 showing how a slide is returned from the projecting position to a slide receiving means in preparation for shifting the next slide, which is at the discharge end of the supply guide means, to the projecting position.

Referring now to the drawings, the photographic projector illustrated therein includes a base plate 1 which is horizontally positioned during use of the projector. This base plate 1 supports a removable hood 2 which covers components of the slide projector, these components being mounted on the base plate 1. As is apparent particularly from FIGS. 2 and 4, the base plate 1 carries a lamp housing 3 whose walls enclose a projection lamp 4, and the walls of the housing 3 also provide suitable supports for elements such as the concave reflector 5, the heat filter 6, as well as the condenser lenses 7 and 8. Just in front of the condenser lens 8 is situated a support 9 which supports a slide in a projecting position, this support 9 being constructed in a known way of guide rails which slidably engage and guide edges of the slide, these rails being of angular cross section. The support 9 positions the slide which happens to be in the projecting position in front of the window or gate 10 situated at the front face of the condenser lens 8. FIGS. 2 and 4 fragmentarily illustrate the objective 11 of the projector.

The base plate 1 carries, beside the lamp housing 3, the supply guide means 12 which receives and guides a series of slides 13, and in addition the base plate 1 carries a slide-receiving means 14 in the form of a guide to which the slides are directed to be received therein after having been situated at the projecting position. Thus, the supply guide means 12 receives in its interior the series of slides 13 which are to be successively projected, while the slide-receiving means 14 receives the slides 15 which have already been projected. A slide-shifting means which is described below shifts the end slide of the series of slides 13 from the supply guide means 12 to the projecting position where the slide is supported by the support 9, and after projection the slide-shifting means displaces a slide from the projecting means to the slide-receiving means 14.

As is schematically indicated in FIGS. 2, 4 and 5, the last slide of the series of slides 13 is engaged by a plate 16 which is urged forwardly by a suitable spring, as schematically indicated by the arrow 17, so that in this way the entire series of slides 13 are urged toward the end wall 18 of the supply guide means 12, this end wall 18 of course being engaged at any given moment only by the end slide of the series of slides 13. In a similar manner the slides 15 in the slide receiving means 14 are engaged by a plate 20 which is urged in the direction of the arrow 19 by a suitable unillustrated spring in a manner well known in the art, and in this way the series of slides 15 are maintained in engagement with an end wall 21 of the slide-receiving means 14, this end wall 21 being illustrated in FIGS. 3–6.

If the slide projector is restricted to use with slides of only a single thickness, then of course there is no particular difficulty in constructing the slide changing structure in such a way that one slide after the other is capable of being projected in a trouble-free manner. However, when the series of slides in the supply guide means 12 are of different thicknesses, then special measures must be taken in order to guarantee that at each slide-changing operation only one slide is displaced from the supply guide means 12 to the projecting position. In order to achieve this latter result, the supply guide means 12 of the invention is provided in the region of its discharge end, as shown most clearly in FIGS. 2, 4, and 5, with inclined side walls 22 which direct the slides at the discharge end of the guide means 12 along a path inclined with respect to the path of movement of the slides 13 in the region of the guide means 12 adjacent the discharge end thereof which is provided with the inclined side walls 22. It is to be noted that the elongated supply guide means 12 of the invention extends in a direction generally parallel to the optical axis of the objective 11, while the inclined side walls 22 at the discharge end of the supply guide means 12 are inclined toward the optical axis. In addition, as is shown most clearly in FIG. 6, the bottom wall of the guide means 12 which extends in a generally horizontal direction during use of the projector is provided at the discharge end of the supply means 12 with an upwardly inclined wall portion 23. Therefore, the supply guide means 12 of the present invention displaces at least the end slide 13 of the series of slides both upwardly and laterally with respect to the slide next to this end slide, so that in the region of the discharge end of the supply guide means 12 the slides are displaced one relative to the other and the slides are not guided along a path which extends exclusively along a straight line. Thus, the series of slides 13 are displaced along a straight line path parallel to the optical axis until they reach the discharge end of the supply guide means 12 whereupon the slides are shifted from this straight line path so that they become displaced one relative to the other, as is clearly illustrated in the drawings. Therefore, the successive slides which tend to cling to each other are displaced relative to each other both laterally and vertically so as to be at least partly separated from each other by the time they reach the end wall 18 of the supply guide means 12. In fact, with the structure illustrated in the drawings the series of slides at the discharge end of the supply guide means 12 are laterally and vertically displaced relative to each other as they move in a stepwise manner toward the end wall 18. In this way the end slide which engages the end wall 18 is in a position where it can be engaged by the slide-shifting means of the invention described below.

In order to prevent, during the discharge of the end slide from the supply guide means 12, the slide next to the end slide from being discharged with the end slide due to the fact that these slides cling to each other, a structure is provided, in accordance with the present invention for automatically adjusting the width of a discharge slot of the guide means 12 so that this width will correspond to the thickness of the end slide which is displaced from the end wall 18 to the projecting position.

This latter structure of the invention includes a thickness-sensing means formed by a lever 25 which is supported by a pivot pin 24, carried by the base plate 1, for turning movement about an axis perpendicular to the base plate 1, this thickness-sensing lever 25 thus turning in a horizontal plane. The thickness-sensing lever 25 has a sensing portion formed by an upwardly directed arm 26 of the lever 25, this arm being in the form of a lug which is integral with and extends upwardly from the remainder of the lever 25, this arm being in the form of a lug which bottom wall portion 23 of the supply guide means 12, and this sensing portion 26 of the thickness-sensing means extends into the space directly beneath the end slide which engages the end wall 18 so that the thickness sensing portion 26 of the thickness-sensing means of the invention is situated directly in front of a front surface portion of the slide next to the end slide, this latter front surface portion of course having been exposed by the shifting of the end slide relative to the slide next to the end slide as a result of the inclination of the bottom wall 23. Thus, by engaging the front exposed surface of the slide which is next to the end slide, the thickness-sensing means 25 automatically assumes a position determined by the thickness of the end slide which engages the end wall 18 of the supply guide means 12. At its free end, which is distant from the pivot 24, the lever 25 is formed with an elongated slot 27 (FIG. 2) which receives a pin 28 fixed to the free end of a lever 29 which forms an adjusting means for adjusting the width of the discharge slot of the supply guide means 12. This lever 29 is in the form of a blocking lever supported for turning movement by a pivot pin 30 which is carried by the base plate 1, and a spring 31 is operatively connected with the lever 29 so as to urge the latter to turn in a clockwise direction, as viewed in FIG. 2, so that as a result, due to the coupling provided by the pin-and-slot connection 28, 27, the lever 25 is urged in a counterclockwise direction, thus maintaining the sensing portion 26 in engagement with the exposed front surface of the slide which is next to the end slide. In this way the single spring means 31 is capable of acting on one of the levers 25 and 29 for automatically urging the thickness-sensing means to the position where it senses the thickness of the end slide, and also the coupling provided by the pin-and-slot connection 28, 27 will cause the adjusting means 29 to be automatically positioned by the thickness-sensing means in the position where the width of the discharge slot of the supply guide means 12 corresponds to the thickness of the end slide which engages the wall 18. The location of the sensing portion 26 of the lever 25 in its position sensing the thickness of the end slide which engages the wall 18 is particularly apparent from FIG. 6.

The adjusting lever 29 is provided with an upwardly directed blocking portion 32 in the form of a lug integral and extending upwardly from the lever 29, and this elongated lug 32 overlaps the discharge slot of the supply guide means 12 to an extent determined by the engagement of the sensing portion 26 of the lever 25 with the exposed front surface of the slide which is next to the end slide, so that in this way the front vertical edge of the lug 32 cooperates with the wall 18 so as to determine the thickness of the discharge slot, this thickness of course automatically corresponding to the thickness of the end slide. Thus, even if the slide next to the end slide should tend to move out of the guide 12 with the end slide, the front vertical edge of the lug 32 will prevent such movement of the slide next to the end slide, so that only the single end slide which engages the wall 18 can be displaced to the projecting position.

The shifting of a slide from the guide 12 to the support 9 which determines the projecting position and from the latter to the slide-receiving means 14 is brought about by a slide-shifting means which is also constructed in accordance with the present invention. This slide-shifting means includes a pair of elongated rods 33 and 34 which extend horizontally in a direction perpendicular to the optical axis and which are guided, respectively, by a pair of openings formed in a wall portion 35 extending angularly from the end wall 18, in the manner shown most clearly in FIGS. 1 and 2. In addition, the slide projector includes intermediate wall portions 36 and 37 respectively formed with openings through which the rods 33 and 34 are guided, so that in this way these rods can only move axially and are maintained parallel to each other. At their outer left ends, as viewed in FIGS. 1 and 2, the rods 33 and 34 are interconnected by a handle 38 which is accessible to the operator so that the operator can manually shift the slide-shifting means of the invention. Adjacent their ends which are distant from the handle 38, an elongated vertical rod 39 extends between and is fixed with the rods 33 and 34, and this rod 39 forms a bearing for the slide-engaging structure.

This slide-engaging structure of the invention is supported for swinging movement by the rod 39 and includes an upper lever 40 as well as an identical lower lever 42. These levers 40 and 42 terminate at their ends which are distant from the rod 39 in a pair of slide-engaging teeth 41 and 43, and of course the rod 39 extends through suitable openings of the levers 40 and 42 so as to support the latter for turning movement to the other. An elongated bar 44 extends between and is fixed to the levers 40 and 42 so that the latter are constrained to turn as a unit, and this bar 44 forms at its left end, as viewed in FIGS. 1 and 2, a slide-engaging means for engaging a slide to shift the latter from the projecting position to the slide-receiving means 14, in a manner described below. The extent of turning of the levers 40 and 42 is limited by transverse slots respectively formed in these levers and respectively receiving pins 45 and 46 which are fixedly carried by the rods 33 and 34. A spring 47 (FIG. 2) is coiled about the rod 39 and presses at one of its ends against the lever 42 so as to urge the levers 40 and 42 in a clockwise direction, as viewed in FIG. 2.

As is most clearly shown in FIG. 1, the end wall 18 of the supply guide means 12 is formed with a pair of elongated clearance slots 48 and 49 which respectively receive the teeth 41 and 43 of the levers 40 and 42. The slide-shifting means is shiftable between the end positions respectively illustrated in FIGS. 1 and 5. In the position of FIG. 1 the slide-shifting means positions a slide in the projecting position, and the end position shown in FIG. 1 is determined, for example, by engagement of the handle 38 with the wall 35. The stop structure for determining the end position of FIG. 5, where the slide-engaging structure engages the end slide preparatory to shifting the latter to the position of FIG. 1, is not illustrated but may take the form, for example, of a collar fixedly mounted on the rod 33 and engaging the wall 36 when the slide-shifting means is in the position of FIG. 5. The end position of the slide-shifting means shown in FIG. 5 is such that in this latter end position the teeth 41 and 43 will reliably engage the left edge of the end slide which engages the end wall 18 of the supply guide means 12, as viewed in FIG. 5. While the edges of the teeth 41 and 43 which engage the left edge of the end slide extend substantially perpendicularly with respect to the direction of movement of the rods 33 and 34, the edges of the teeth 41 and 43 which are directed away from the left edge of the end slide, in the position of the parts shown in FIG. 5, are sharply inclined and engage the ends of the slots 48 and 49, respectively, when the slide-shifting means is in the position of FIG. 5, to displace the levers 40 and 42 in opposition to the spring 47 about the rod 39 to an extent which permits the teeth 41 and 43 to extend into the discharge end of the guide means 12, when the slide-shifting means is in the position of FIG. 5, to an extent equal only to the thickness of that one of the slides 13 which has a lesser thickness than any of the other slides. Thus, when the rods 33 and 34 are shifted by the operator from the position of FIG. 1 to the position of FIG. 5, the inclined edges of the teeth 41 and 43 will initially engage the right edge of the end slide while the levers 40 and 42 are displaced about the rod 39 in opposition to the spring 47, and during the continued shifting of the rods 33 and 34 to the left the tips of the teeth 41 and 43 will engage and ride along the front surface of the end slide while these tips, which may be slightly rounded, move along the slots 48 and 49, respectively. When the tips of the teeth reach the left edge of the end slide the spring 47 turns these teeth into the discharge end of the guide 12 alongside of the left edge of the slide, but in this end position of the rods 33 and 34, shown in FIG. 5, the inclined edges of the teeth engage the ends of the slots 48 and 49 so as to permit the teeth to overlap the left edge of the end slide only to an extent which at its maximum is equal to the thickness of the slide 13 which is of minimum thickness.

During the subsequent displacement of the slide-shifting means back to the position of FIG. 1 the teeth 41 and 43 will move away from the ends of the slots 48 and 49 so that now the spring 47 will place these teeth in engagement, at their tips, with the front surface of the slide which is next to the end slide, so that now the teeth will engage the end slide throughout the entire width of its left edge as these teeth ride along the front surface of the slide next to the end slide. As soon as the tips of the teeth reach the right edge of the slide which is next to the end slide, the teeth can be turned by the spring 47 through the distance determined by the front ends of the slots which respectively engage the pins 45 and 46, and in this very secure and reliable position of the teeth 41 and 43 with respect to the end slide, the latter is shifted along the guide rails of the support 9 into the projecting position. Thus, once the teeth move beyond the slide which is next to the end slide they can reliably engage the left edge of a slide which is of maximum thickness for reliably shifting such a slide into the projection position. In order to avoid any engagement between the teeth 41 and 43 and the elongated blocking lug 32 of the adjusting lever 29, this lug 32 is formed with clearance notches through which the teeth 41 and 43 are capable of freely passing without engaging the lug 32 even when the latter is adjusted to a slot of minimum width, and these clearance notches are most clearly shown in FIG. 1.

As is particularly apparent from FIGS. 3–6, the structure includes a yieldable means 50 which yields during engagement by a slide moving from the guide 12 to the projecting position but which deflects a slide from the projecting position into the slide-receiving means 14, as is most clearly shown in FIG. 4. This yieldable means 50 is in the form of a plate pivotally supported at 51 for turning movement about a vertical axis, this support 51 being formed by pivot pins carried, for example, by lugs projecting from stationary intermediate walls of the projector, one of these lugs projecting from the wall 21, for example, and these lugs support a pair of coaxial pivot pins 51 which are respectively received in openings formed in a pair of ears which are integral with the plate 50 and which extend perpendicularly therefrom, in the manner shown most clearly in FIGS. 4 and 5. An unillustrated spring acts on the plate 50 to urge the latter in a counterclockwise direction, as viewed in FIGS. 4 and 5, to the position shown in FIGS 4 and 5, any suitable stationary stop being provided so as to limit the counterclockwise turning of the plate 50 by the unillustrated spring to such an extent that the plate 50 can move in a counterclockwise direction only to the position shown in FIGS. 4 and 5, while at the same time the plate 50 is capable of yielding in a clockwise direction, as viewed in FIGS. 4 and 5. Thus, as the slide-shifting means displaces the end slide from the discharge end of the supply guide means 12 to the projecting position, the right edge of this slide will engage the plate 50 and will turn it in a clockwise direction while this end slide moves to the projecting position. On the other hand, when a slide, such as the slide 13a of FIG. 4, is displaced by the plate 44 from the projecting position back toward the guide 12, the plate 50 will engage the left edge of a slide such as the slide 13a and will deflect this slide into the slide-receiving means 14, in the manner shown most clearly in FIG. 4. In the event that the frames of the slides are made of a yieldable material such as a suitable cardboard, the deflecting plate 50 will simply snap the upper and lower edges of the slides out of the guides which form the support 9, but if preferred these angle guides can be urged by suitable springs to positions for properly supporting a slide in the projecting position while at the same time the rails which form the support 9 are capable of yielding during deflection of a slide by the plate 50 so as to permit the slide to move in the manner shown for the slide 13a in FIG. 4, and of course the left edge of the plate 50 joins the right edge of the wall 21, in the manner shown in FIG 4, so that each slide 13a will engage the end slide 15 and will displace it forwardly in opposition to the force 19 so that in this way the slides are successively transferred into the guide 14 after having been located at the projecting position. As is apparent from FIG. 3, the element 44 which shifts the slides into the slide-receiving means 14 extends above and below the yieldable means 50, and along its rear vertical edge the element 44 is formed with a suitable notch which receives the plate 50 so as to provide clearance for the latter when the parts have the position shown in FIG. 5.

While the above-described structure includes a manually operable slide-shifting means, it is of course to be understood that the invention can also be used with a structure where a suitable motor drives the slide-shifting means back and forth.

Having described the present invention, that which is sought to be protected is set forth in the following claims.

What is claimed is:

1. In a slide projector, supply guide means for guiding a series of slides along a predetermined path, said supply guide means having a discharge end where an end slide of said series of slides is situated in a position to be removed from said slide guide means and to be displaced therefrom to a projecting position, said supply guide means providing for said path in the region of said discharge end of said supply guide means a direction which is inclined with respect to a portion of said path adjacent but spaced from said discharge end of said supply guide means, so that at least the end slide of said series of slides is displaced with respect to the slide next to said end slide to expose a surface of said slide next to said end slide, thickness-sensing means located at said discharge end of said slide guide means for engaging said surface of said slide next to said end slide so as to sense the thickness of said end slide, said supply guide means having at said discharge end thereof a discharge slot through which said end slide is displaced when moving from said supply guide means to said projecting position, and adjusting means automatically actuated by said thickness-sensing means for adjusting the width of said slot to a size corresponding to the thickness of said end slide, whereby if the slide next to said end slide, by clinging to the latter, should tend to be displaced from said supply guide means with said end slide, said slot because it is adjusted to a thickness corresponding to that of said end slide will prevent said slide next to said end slide from being displaced out of said supply guide means with said end slide.

2. In a slide projector as recited in claim 1, said portion of said path which is adjacent said inclined portion at said discharge end of said supply guide means extending in a generally horizontal direction during use of the slide projector, and said inclined portion of said path at said discharge end of said supply guide means being inclined both vertically and laterally with respect to said portion of said path adjacent said inclined portion, so that said end slide is displaced in two mutually perpendicular directions with respect to said slide next to said end slide.

3. In a slide projector, an objective having a predetermined optical axis, supply guide means for receiving and guiding a series of slides which engage each other, said supply guide means having a discharge end communicating with a discharge slot of said supply guide means through which an end slide of said series of slides is adapted to be displaced to a projecting position where said optical axis extends through the slide, said supply guide means, except for the region thereof at said discharge end, extending generally parallel to said optical axis and having at said discharge end a bottom wall inclined upwardly with respect to an adjoining bottom wall of said supply guide means and a side wall inclined toward the optical axis with respect to a side wall portion which extends substantially parallel to the optical axis, so that said inclined bottom and side walls at the region of said discharge end of said supply guide means displace at least said end slide with respect to a slide next to said end slide to expose a front surface portion of said slide next to said end slide, thickness-sensing means situated at said discharge end of said supply guide means for engaging said front surface of said slide next to said end slide so as to automatically sense the thickness of said end slide, and adjusting means automatically actuated by said thickness-sensing means for adjusting the width of said discharge slot to a size corresponding to the thickness of said end slide so as to permit only said end slide to be displaced from said supply guide means to said projecting position.

4. In a slide projector as recited in claim 3, said supply guide means having a discharge end wall engaged by said end slide and said thickness sensing means including a spring which urges said thickness sensing means into engagement with said front surface of said slide which is next to said end slide.

5. In a slide projector as recited in claim 4, said thickness-sensing means including in addition to said spring a thickness-sensing lever supported for turning movement and having a sensing portion extending into said supply guide means at said discharge end thereof and urged by said spring into engagement with said front surface of said slide next to said end slide, said adjusting means being in the form of a blocking lever also supported for turning movement and coupled to said thickness-sensing lever to be turned by the latter to a position blocking said discharge slot to an extent which uncovers said slot by an amount conforming to the width of said end slide.

6. In a slide projector as recited in claim 4, said inclined bottom wall of said supply guide means at said discharge end thereof being formed with an opening through which a portion of said thickness-sensing means extends into the space beneath said end slide for engaging a lower front surface portion of said slide next to said end slide.

7. In a slide projector as recited in claim 4, said adjusting means including a lever supported for turning movement and having a blocking lug extending generally parallel to and overlapping said discharge slot to an extent determined by said thickness-sensing means.

8. In a slide projector, supply guide means for receiving and guiding a series of slides along a predetermined path, said supply guide means having a discharge end provided with a discharge slot through which an end slide of said series of slides is adapted to be displaced to a projecting position, said supply guide means being inclined at the region of said discharge end thereof with respect to the portion of said supply guide means adjacent said discharge end thereof so as to displace at least an end slide of said series of slides with respect to a slide next to said end slide, so as to expose a front surface portion of said slide next to said end slide, a thickness-sensing lever turnably mounted adjacent said discharge end of said supply guide means and having a sensing portion extending into said discharge end of said supply guide means for engaging said front surface of said slide next to said end slide so as to assume a position corresponding to the thickness of said end slide, an adjusting lever also supported for turning movement and coupled to said thickness-sensing lever to be turned by the latter, said adjusting lever having an elongated slot-adjusting portion overlapping said discharge slot to an extent determined by the angular position of said thickness-sensing lever so that the width of said slot is adjusted automatically in accordance with the thickness of said end slide, and a single spring means operatively connected to one of said levers for urging both of said levers in a direction which yieldably maintains said sensing portion of said sensing lever in engagement with said slide next to said end slide.

9. In a slide projector, supply guide means for guiding a series of slides along a predetermined path, said supply guide means having a discharge end provided with an end wall engaged by an end slide of said series of slides, and said supply guide means being formed next to said end wall with a discharge slot through which said end slide is adapted to be displaced from said discharge end of said supply guide means to a projecting position, said supply guide means being inclined in the region of said discharge end thereof with respect to the portion of said supply guide means adjacent said discharge end thereof so that said end slide is displaced with respect to a slide next to said end slide to expose a front surface portion of said slide next to said end slide, thickness sensing means engaging said front surface portion of said slide next to said end slide for sensing automatically the thickness of said end slide, adjusting means automatically actuated by said thickness-sensing means for adjusting the width of said discharge slot to a size corresponding to the width of said end slide, so that only said end slide can be displaced through said discharge slot, and slide-shifting means for shifting said end slide from said discharge end of said supply guide means to said projecting position, said slide-shifting means having at least one tooth for engaging an edge of said end slide to displace the latter from said discharge end of said supply guide means to said projecting position, and said end wall of said supply guide means being formed with a clearance slot which receives said tooth during part of the movement of said slide-shifting means.

10. In a slide projector as recited in claim 9, said slide-shifting means being shiftable between a projecting position locating said end slide in a projecting position and a slide-engaging position engaging said end slide when the latter is situated at said discharge end of said supply guide means, said tooth extending into said discharge end of said supply guide means when said slide-shifting means is at said slide-engaging position thereof to an extent equal to the thickness of that one of said series of slides which is of less thickness than any other one of said series of slides.

11. In a slide projector, elongated supply guide means for receiving and guiding a series of slides along a predetermined path, said supply guide means having a discharge end where an end slide of said series of slides is situated in a position to be displaced from said discharge end of said supply guide means to a projecting position, said supply guide means having an end wall at said discharge end thereof engaged by said end slide and being formed next to said end wall with a discharge slot through which said end slide is adapted to be displaced upon moving from said supply guide means to said projecting position, said supply guide means being inclined in the region of said discharge end thereof with respect to a portion of said supply guide means next to said region of said discharge end thereof so that said end slide is displaced with respect to a slide next to said end slide so as to expose a front surface portion of said slide next to said end slide, thickness-sensing means engaging said front surface portion of said slide next to said end slide for automatically sensing the thickness of said end slide, adjusting means automatically actuated by said thickness-sensing means for adjusting the width of said slot to a width corresponding to that of said end slide so that only said end slide can be displaced from said supply guide means to said projecting position, and slide-shifting means displaceable between a projecting position situating a slide in a position for having its image projected and a slide-engaging position for engaging a slide to displace the latter through said slot to said projecting position, said slide-shifting means including a pair of levers respectively having toothed ends for engaging an edge of said end slide and said end wall of said supply guide means being formed with a pair of clearance slots which receive said toothed ends of said levers to provide clearance for said toothed lever ends, said toothed ends of said levers respectively having directed away from an edge of said end slide engaged by said toothed ends of said levers inclined edges which engage ends of said clearance slots, respectively, in said slide-engaging position of said slide-shifting means to situate said toothed ends of said levers at positions extending into said discharge end of said slide guide means by a distance which is no greater than the thickness of that one of said series of slides which is of lesser thickness than any other one of said series of slides.

12. In a slide projector, supply guide means for receiving and guiding a series of slides which are to be projected, said supply guide means being formed at a discharge end thereof with a discharge slot through which an end slide of said series of slides is adapted to be displaced from said supply guide means to a projecting position, and said supply guide means being inclined in the region of said discharge end thereof with respect to a portion of said supply guide means adjacent said discharge end thereof so as to displace said end slide with respect to a slide next to said end slide so as to expose a front surface portion of said slide next to said end slide, thickness-sensing means engaging said exposed front surface portion of said slide next to said end slide for automatically sensing the thickness of said end slide, adjusting means automatically actuated by said thickness-sensing means for adjusting the width of said slot to a size coresponding to the thickness of said end slide so that only said end slide can be displaced from said supply guide means to said projecting position, slide-shifting means for shifting said end slide from said supply guide means through said slot to said projecting position, slide-receiving means for receiving slides after they have been situated at said projecting position, said slide-shifting means displacing a slide from said projecting position to said slide-receiving means during movement of said slide-shifting means to engage an end slide at said discharge end of said supply guide means for moving said latter end slide to said projecting position, and yieldable means situated in the path of movement of an end slide from said discharge end of said supply guide means to said projecting position as well as in the path of movement of a slide from said projecting position to said slide-receiving means, said yieldable means yielding to a slide moving from said supply guide means to said projecting position but blocking a slide which tends to be returned from said projecting position to said supply guide means and deflecting said latter slide into said slide-receiving means.

References Cited by the Examiner

UNITED STATES PATENTS

| | | | |
|---|---|---|---|
| 2,525,564 | 10/1950 | Simmons | 88—28 |
| 2,583,442 | 1/1952 | Parlini | 40—79 |
| 2,594,162 | 4/1952 | Hartley | 88—28 |
| 2,808,760 | 10/1957 | Gill | 88—28 |
| 2,844,895 | 7/1958 | Brumberger | 88—28 X |
| 3,238,653 | 3/1966 | Wiklund | 40—79 |

NORTON ANSHER, *Primary Examiner.*